(12) United States Patent  
Hosyuyama (10) Patent No.: US 7,620,259 B2  
(45) Date of Patent: Nov. 17, 2009

(54) HISTORY ADDING DEVICE FOR GENERATING HISTORY-ADDED IMAGE FILE, ELECTRONIC CAMERA, AND IMAGE PROCESSING PROGRAM FOR PROCESSING HISTORY-ADDED IMAGE FILE

(75) Inventor: Hideo Hosyuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 659 days.

(21) Appl. No.: 11/321,871

(22) Filed: Dec. 30, 2005

(65) Prior Publication Data

US 2006/0164525 A1 Jul. 27, 2006

(30) Foreign Application Priority Data

Jan. 11, 2005 (JP) ............................. 2005-004049

(51) Int. Cl.
*G06K 9/40* (2006.01)
*H04N 5/262* (2006.01)
*G06K 9/00* (2006.01)

(52) U.S. Cl. ........................ 382/254; 382/266; 348/239

(58) Field of Classification Search ................ 382/162, 382/164, 165, 167, 190, 219, 220, 232, 233, 382/254, 266, 274–276, 284, 294, 300, 302; 358/1.9, 448, 515, 518, 530; 348/239, 423.1; 355/40, 41, 54, 77; 375/240.12, 240.26; 345/419, 420, 423, 428

See application file for complete search history.

(56) References Cited

U.S. PATENT DOCUMENTS

| 6,122,069 | A | 9/2000 | Kendall et al. |
| 6,208,347 | B1* | 3/2001 | Migdal et al. ................ 345/419 |
| 6,556,627 | B2* | 4/2003 | Kitamura et al. ........ 375/240.26 |
| 2002/0102022 | A1* | 8/2002 | Ma et al. ..................... 382/170 |
| 2003/0067554 | A1* | 4/2003 | Klarfeld et al. ............. 348/461 |
| 2005/0111053 | A1* | 5/2005 | Yoshida et al. ............. 358/448 |
| 2006/0164525 | A1* | 7/2006 | Hosyuyama ................ 348/239 |

FOREIGN PATENT DOCUMENTS

| EP | 1 394 740 A2 | 3/2004 |
| EP | 1 560 162 A2 | 8/2005 |
| JP | A 2001-060876 | 3/2001 |
| JP | A 2001-061067 | 3/2001 |
| JP | A 2001-061146 | 3/2001 |
| JP | A 2002-330388 | 11/2002 |
| JP | A 2003-244507 | 8/2003 |
| JP | A 2003-244527 | 8/2003 |
| JP | A 2003-299005 | 10/2003 |

\* cited by examiner

*Primary Examiner*—Amir Alavi
(74) *Attorney, Agent, or Firm*—Oliff & Berridge, PLC (57) ABSTRACT

A history adding device includes an image processing unit and a history adding unit. The image processing unit applies image processing to an input image to generate a processed image. The history adding unit generates history information necessary for restoration processing in which the processed image is restored to the input image. The history adding unit adds the history information to the processed image to generate a history-added image file to which the restoration processing is executable.

8 Claims, 5 Drawing Sheets

INPUT IMAGE (AT RESTORATION STEP) BEFORE COLOR INTERPOLATION

PROCESSED IMAGE

"EXTRACTION OF COLOR SIGNALS"

DIFFERENCE IMAGE

=

COLOR PATTERN IMAGE

−

INPUT IMAGE

HISTORY ADDING DEVICE FOR GENERATING HISTORY-ADDED IMAGE FILE, ELECTRONIC CAMERA, AND IMAGE PROCESSING PROGRAM FOR PROCESSING HISTORY-ADDED IMAGE FILE

CROSS REFERENCE TO RELATED APPLICATION

This application is based upon and claims the benefit of priority from Japanese Patent Application No. 2005-004049, filed on Jan. 11, 2005, the entire contents of which are incorporated herein by reference.

BACKGROUND OF THE INVENTION

1. Field of the Invention

The present invention relates to a history adding device that generate a history-added image file and an electronic camera. The present invention also relates to an image processing program for processing the history-added image file.

2. Description of the Related Art

In a conventional electronic camera, image processing such as color interpolation, color correction, noise filtering, and edge enhancement is applied to image data. A processed image thus generated is highly versatile and convenient for a user because it is easily opened by general image display software for printing.

Also, there is another known electronic camera that generates a RAW image approximate to an image outputted from an image sensor. A user can apply advanced image processing to this RAW image later (ex-post determination of image quality). A user can also create images later according to his/her intended uses, for example, creating from one RAW image an image suitable for high-definition printing as well as a small image suitable for electronic mail enclosure (for multiple purposes). In addition, storing an image in a RAW image form makes it possible to apply a future-available advanced image processing thereto. Accordingly, images of better quality than that of images obtained at the time of shooting will be obtainable in the future (the application of the latest technology).

As described above, the processed image is advantageous in its usability, while the RAW image is advantageous in the ex-post applicability of advanced image processing.

There is a known electronic camera that selects one of the processed image and RAW image to record the selected image (for example, disclosed in Japanese Unexamined Patent Application Publication No. 2001-61067). Also, another known electronic camera generates both the RAW image and the processed image at each shooting and records them independently (for example, simultaneous recording of RW+JPEG).

However, there are some cases where additional image processing is performed on a completed processed image later, for example, where a user later adjusts image quality of the processed image as desired, or an output device such as a printer automatically makes additional adjustment to image quality of the processed image in order to optimize it for output. Such additional image processing causes degradation in image quality, for example, as follows.

EXAMPLE 1

High-frequency noise in an image increases or an edge waveform deteriorates such as the occurrence of thick overshoot and jaggy when an edge-enhanced, processed image in the electronic camera is later subjected to additional high-frequency enhancement such as unsharp masking.

EXAMPLE 2

Color saturation in a specific color gamut impairs natural hue when the processed image subjected to large saturation enhancement in the electronic camera is later subjected to saturation enhancement in the specific color gamut.

EXAMPLE 3

False color in color interpolation is enhanced when a color-interpolated, processed image in the electronic camera is later subjected to saturation enhancement.

In order to avoid such degradation in image quality, the use of the RAW image is effective. However, the RAW image is less usable than the processed image since it cannot be directly printed.

The advantages of the processed image and RAW image can be achieved by the simultaneous recording of RAW+JPEG. However, there is a problem in the simultaneous recording of RAW+JPEG that the two the image files are separately recorded, increasing data amount.

SUMMARY OF THE INVENTION

It is an object of the present invention to provide a technique for generating and processing new image data (referred to as a history-added image file in the claims) having the advantages of both of the usable processed image and the RAW image to which the advanced image quality processing is applicable.

Hereinafter, the present invention will be described.

<<1>> A history adding device of the present invention includes an image processing unit and a history adding unit. The image processing unit applies image processing to an input image to generate a processed image. The history adding unit generates history information necessary for restoration processing in which the processed image is restored to the input image. The history adding unit adds the history information to the processed image to generate an image file being able to be subjected to the restoration processing (hereinafter, referred to as a history-added image file).

<<2>> Preferably, the history adding unit judges whether the image processing is substantially reversible/irreversible, according to a setting of the image processing. When judging that the image processing as irreversible, the history adding unit adds a difference image between the input image and the processed image to the processed image as the history information. On the other hand, when judging the image processing as reversible, the history adding unit adds, to the processed image as the history information, information indicating a setting of the image processing or information indicating inverse transformation of the image processing.

<<3>> Preferably, the input image which the history adding device handles is a color image having a plurality of kinds of color signals on each pixel. In this case, the history adding unit generates a difference image between the input image and the processed image for each of the color signals. The history adding unit adds the difference image for each of the color signals to the processed image as the history information.

<<4>> Preferably, the input image which the history adding device handles is a color image having a plurality of kinds of color signals arranged on each pixel according to a predetermined color pattern. In this case, the image processing unit applies at least color interpolation to the input image to generate a processed image having the plural kinds of the color components are arranged on each of the pixels.

In this case, the history adding unit extracts color signals of the color pattern from the processed image to generate a color pattern image. The history adding unit finds a difference image between the input image and the color pattern image to add the difference image to the processed image as the history information.

<<5>> An electronic camera of the present invention includes: the history adding device according to any one of the above <<1>> to <<4>>; and an image-capturing unit capturing an image of a subject to generate an input image. The electronic camera processes the input image in the history adding device to generate the history-added image file.

<<6>> Preferably, the history adding device finds a difference image between an image before edge enhancement and an image after edge enhancement. The history adding device adds the difference image to the image after edge enhancement as the history information. By such a history adding device, the electronic camera generates the history-added image file from which an effect of the edge enhancement thereof can be eliminated later.

<<7>> Preferably, the history adding device finds a difference image between an image before saturation enhancement and an image after saturation enhancement. The history adding device adds the difference image to the image after saturation enhancement as the history information. By such a history adding device, the electronic camera generates the history-added image file from which an effect of the saturation enhancement thereof can be eliminated.

<<8>> An image processing program of the present invention causes a computer to apply image processing to the history-added image file generated in the electronic camera according to any one of the above <<5>> to <<7>>. The image processing program causes the computer to function as an input processing unit, a restoration processing unit, and an image re-processing unit.

The input processing unit obtains the processed image and the history information from the history-added image file. Meanwhile, the restoration processing unit applies a restoration processing indicated by the history information to the processed image to obtain a restored image (an image approximate to the input image before the image processing). The image re-processing unit applies a new image processing to the restored image obtained by the restoration processing unit.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DETAILED DESCRIPTION OF THE PREFERRED EMBODIMENTS

Hereinafter, embodiments of the present invention will be described in detail with reference to the drawings.

Embodiment of Electronic Camera and History Adding Device

[Description of Configuration]

Figure 1:
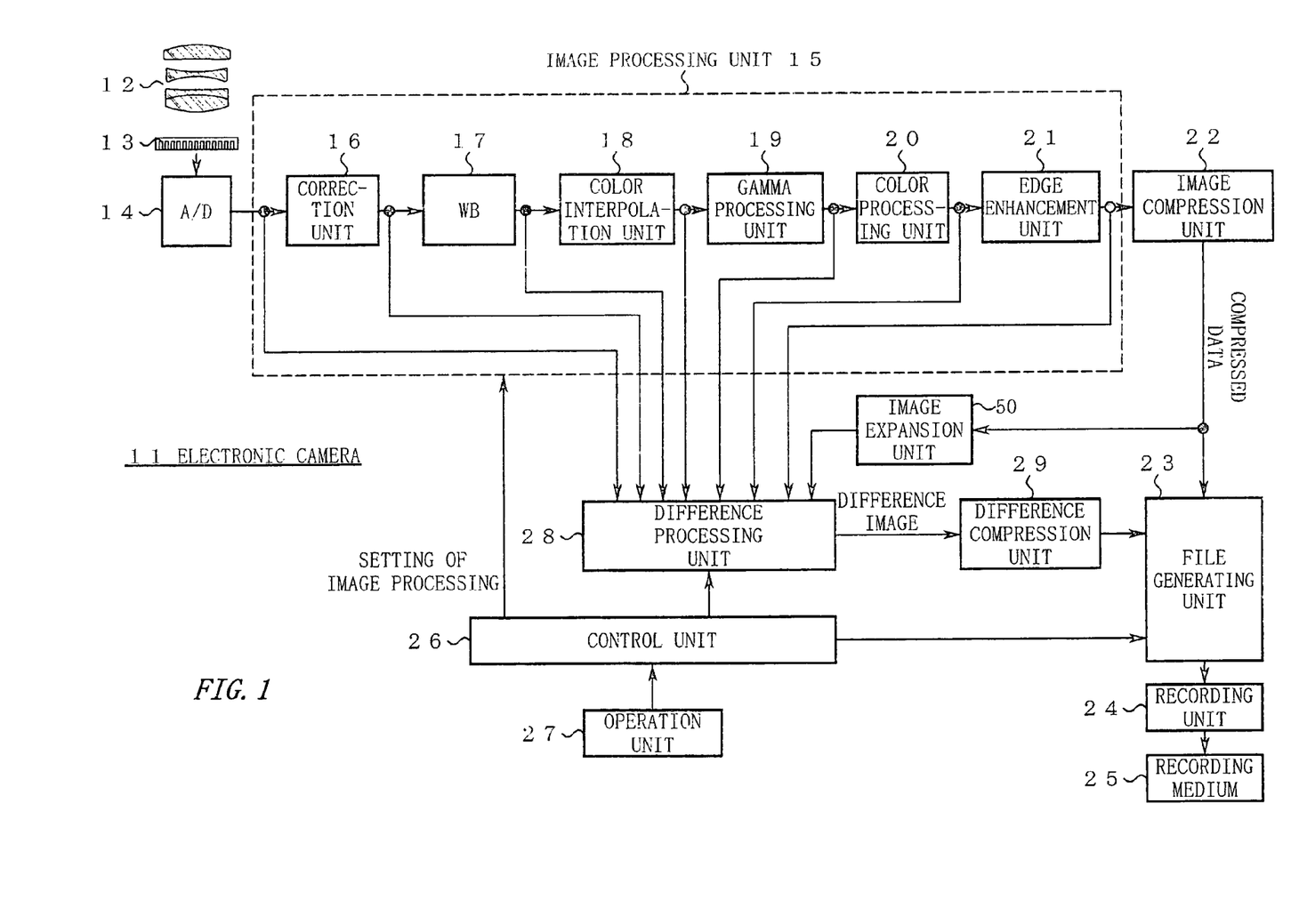
FIG. 1 is a diagram showing a configuration of an electronic camera 11 of an embodiment of the present invention.

FIG. 1 is a diagram showing a configuration of an electronic camera 11 of an embodiment of the present invention.

In FIG. 1, a photographing lens 12 is attached to the electronic camera 11. In an image space of the photographing lens 12, a light-receiving surface of an image sensor 13 is disposed. RGB color filters in the Bayer pattern are disposed on the light-receiving surface of the image sensor 13. A RAW image in which color signals are arranged in the Bayer pattern is generated. The RAW image is converted to a digital image via an A/D converter 14, and thereafter inputted to an image processing unit 15.

The image processing unit 15 includes the following processing units.

(1) a correction unit 16 to correct characteristics mainly of the image sensor 13, such as offset correction, fixed pattern noise correction, and linearity correction (2) a white balance correction unit 17 to correct color cast in the RAW image due to color temperature of a light source, by gain adjustment of an RR color signal and a B color signal (3) a color interpolation unit 18 to color-interpolate the RAW image in the Bayer pattern to generate image data in which each pixel has the color signals of RGB (4) a gamma processing unit 19 to correct the tone of the image data (5) a color processing unit 20 to apply saturation enhancement and hue correction to the image data (6) an edge enhancement unit 21 to enhance the edge of the image data A processed image resulting from the image processing via these processing units 16 to 21 is inputted to an image compression unit 22. The image compression unit 22 compresses the inputted image data to output compressed data to a file generating unit 23.

The electronic camera 11 also includes a control unit 26 for system control, an operation unit 27, a difference processing unit 28, and an image expansion unit 50. The difference processing unit 28 reads an image selectively from the processing units 16 to 21 of the image processing unit 15 to generate a difference image. The difference image is outputted to a difference compression unit 29. The difference compression unit 29 compresses the difference image to output the compressed difference image to the file generating unit 23.

The file generating unit 23 outputs a history-added image file. The history-added image file is recorded in a recording medium 25 via a recording unit 24.

[Description of Operations]

Figure 2:
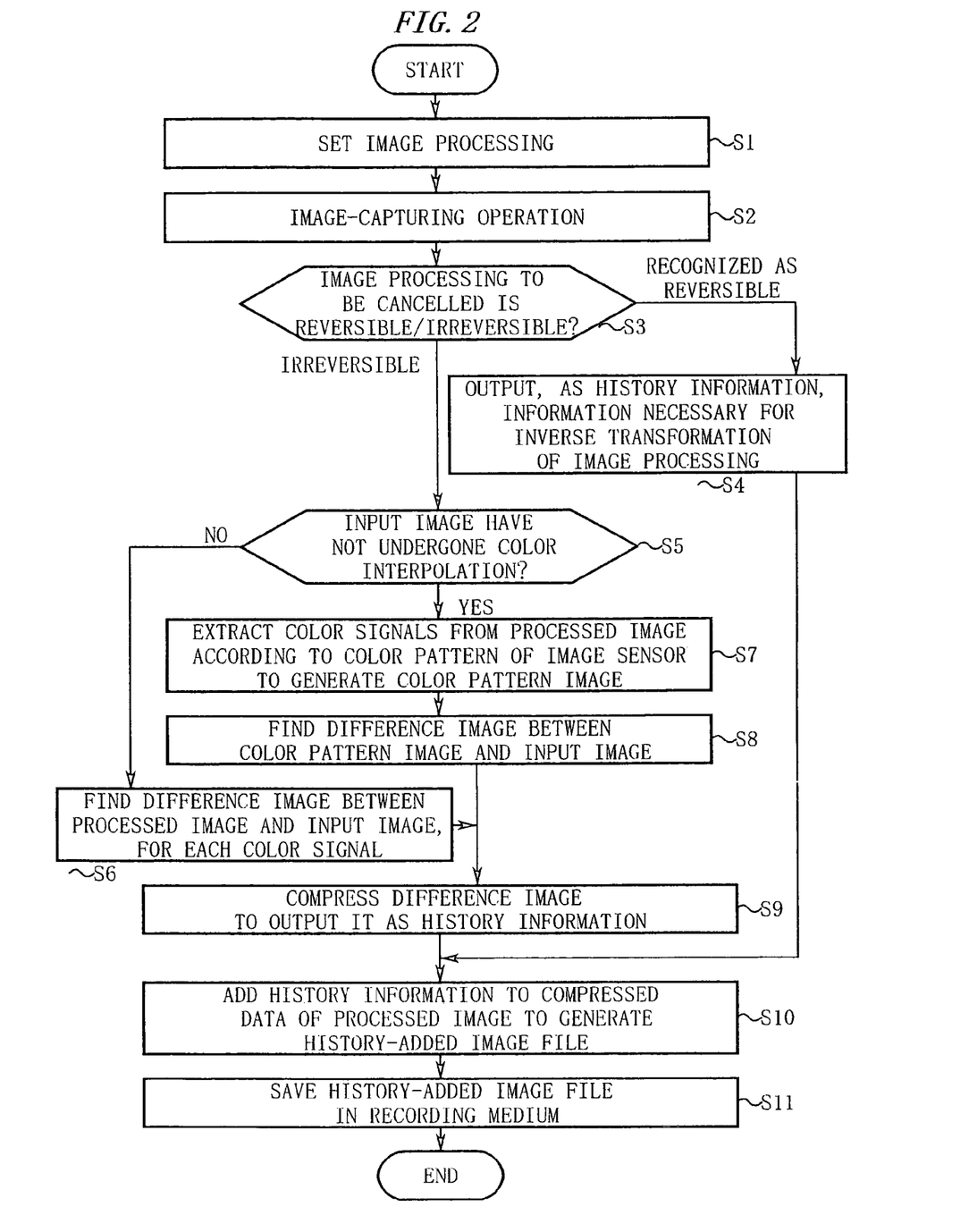
FIG. 2 is a flowchart showing operations of generating a history-added image file.

FIG. 2 is a flowchart showing operations of generating the history-added image file. The operations of generating the history-added image file will be described below, following the step number shown in FIG. 2.

Step S1: The control unit 26 sets the image processing of the processing units 16 to 21 according to an image quality mode set via the operation unit 27.

Step S2: In response to a release operation (the operation unit 27) from a user, the control unit 26 controls the image sensor 13 to drive it. The image sensor 13 captures an image of a subject to output the RAW image. The RAW image is turned into the processed image step by step via the processing units 16 to 21 of the image processing unit 15. The processed image is compressed by the image compression unit 22 and thereafter is outputted as the compressed data to the file generating unit 23.

Step S3: In the electronic camera 11, using a custom setting function, it is possible to arbitrarily designate one of the processings of the processing units 16 to 21 as a restoration step of the image processing on the history-added image file. Note that in the initial setting, the RAW image outputted from the correction unit 16 (a step in which only characteristic compensation to the image sensor 13 has been executed) is set as an image in the restoration step.

The control unit 26 judges whether an image processing group executed between the image in the restoration step and the processed image (i.e., the image processing to be cancelled) is reversible or not.

The reversibility may be judged simply from the kind or combination of the image processings. Alternatively, for more accurate judgment on reversibility, irreversible transformation such as tone jump, color saturation, black crushing may be detected by histogram analysis or the like before/after the image processing.

When the image processings to be cancelled can be considered as reversible as a result of the judgment, the control unit 26 shifts its operation to Step S4. On the other hand, when the image processing to be cancelled is irreversible, the control unit 26 shifts its operation to Step S5.

Step S4: Here, since the image processings to be cancelled is considered as reversible, the restoration processing may be the inverse transformation of the image processings in a reverse order. Such inverse transformation can be found by calculation based on a mathematical model of image processing. Further, it is also possible to experimentally determine such inverse transformation.

In the control unit 26, information necessary for the inverse transformation is stored in advance in the form of a table. The control unit 26 refers to the table for the image processing to be cancelled (specifically, a processing parameter) to obtain a corresponding inverse transformation parameter. The control unit 26 outputs the inverse transformation parameter as the history information to the file generating unit 23. As the history information, the control unit 26 may output, to the file generating unit 23, a processing parameter indicating the image processing to be cancelled.

After such processing, the control unit 26 shifts its operation to Step S10.

Step S5: The control unit 26 judges whether or not an image at the restoration step (corresponding to the input image in the claims) is an image before color interpolation (a so-called RAW image).

Here, if the image at the restoration step is a color-interpolated image having all the color signals of the three RGB phases, the control unit 26 shifts its operation to Step S6.

On the other hand, if the image at the restoration step is an image before color interpolation and having the color signals arranged in the Bayer pattern, the control unit 26 shifts its operation to Step S7.

Figure 3:
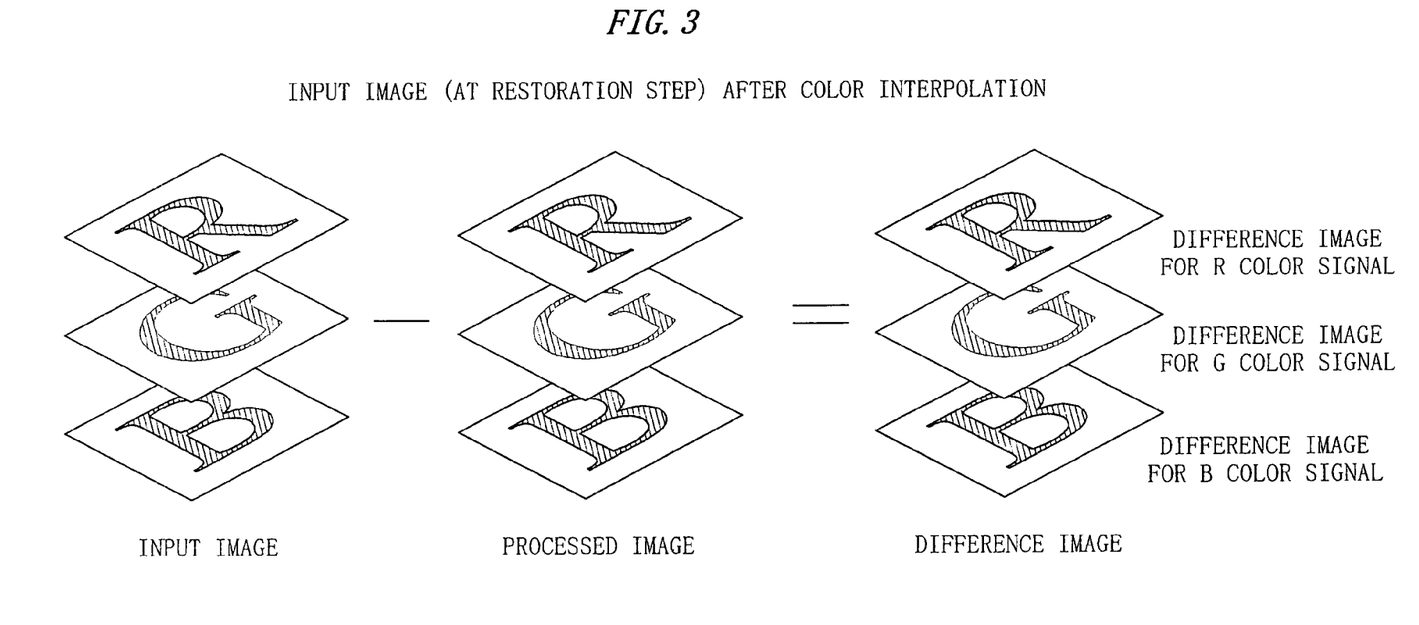
FIG. 3 is a view showing operations of generating difference images.

Step S6: The control unit 26 instructs the difference processing unit 28 to execute difference processing for each of the color signals. The difference processing unit 28 reads the processed image outputted from the image processing unit 15 or from the image expansion unit 50 and the image at the restoration step to generate a difference image for each color signal as shown in FIG. 3.

After thus obtaining the difference images, the control unit 26 shifts its operation to Step S9.

Step S7: The control unit 26 instructs the difference processing unit 28 to generate a color pattern image in the same color pattern as that of the RAW image. The difference processing unit 28 obtains the processed image outputted from the image processing unit 28 or the image expansion unit 50 to determine one kind of color signal for each pixel according to the color pattern of the image sensor 13. By such processing, the color pattern image in the same color pattern as that of the RAW image, which is generated by transforming the processed image, can be obtained.

Figure 4:
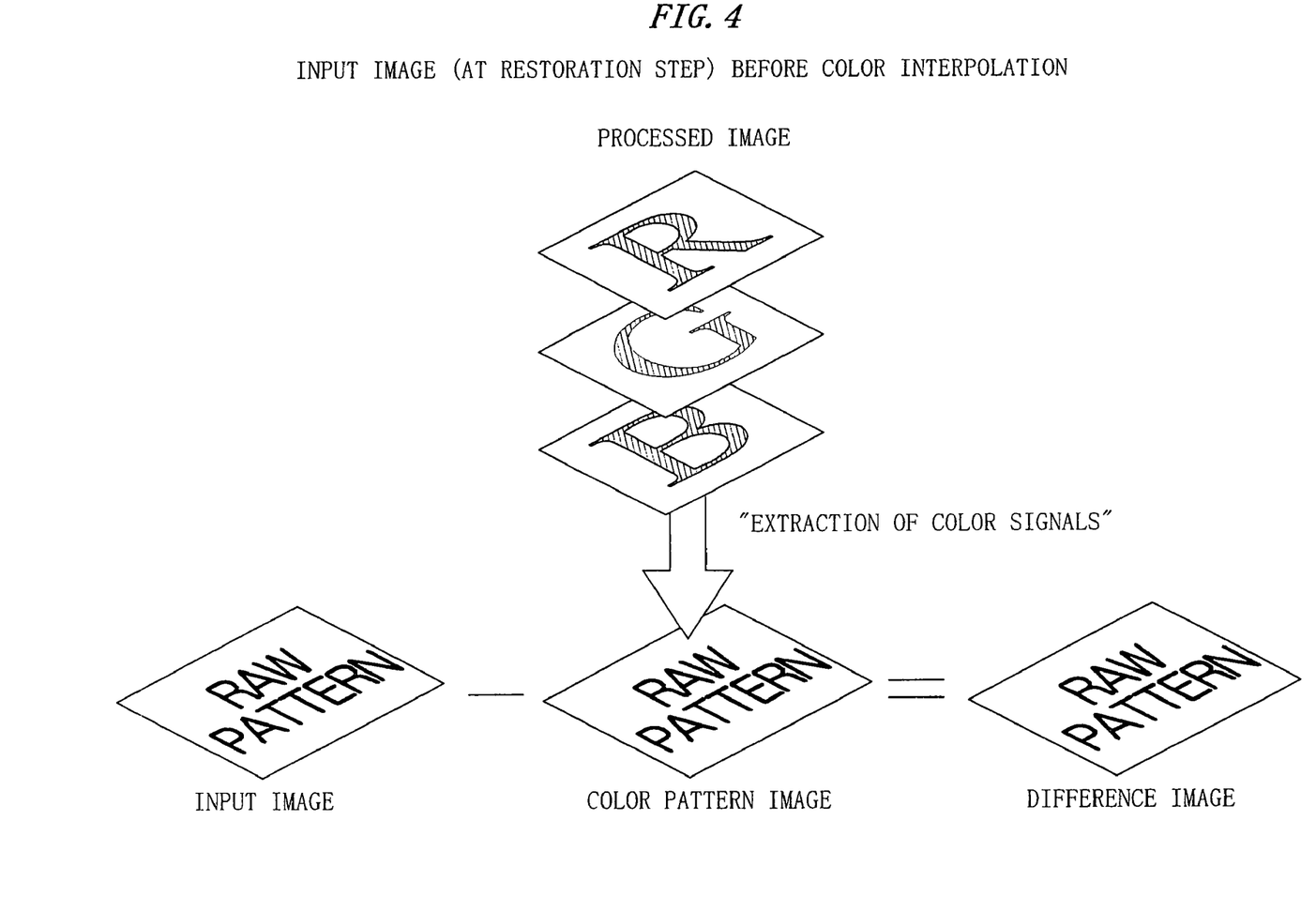
FIG. 4 is a view showing operations of generating a difference image.

Step S8: The difference processing unit 28 generates a difference image between the image at the restoration step (the input image in the RAW image form) and the color pattern image, as shown in FIG. 4.

After thus obtaining the difference image, the control unit 26 shifts its operation to Step S9.

Step S9: The difference compression unit 29 compresses the difference image outputted from the difference processing unit 28 to output the compressed difference image as the history information to the file generating unit 23.

Step S10: The file generating unit 23 adds the history information to the compressed data (the result of the compression of the processed image) inputted from the image compression unit 22 to generate the history-added image file.

The history-added image file has a file structure, for example, as follows.

(1) SOI (Start Of Image) marker
(2) metadata based on the Exif standard
(3) DQT (quantization table)
(4) SOF (frame header)
(5) DHT (Huffman table)
(6) SOS (scan header)
(7) compressed data of the processed image
(8) EOI (End Of Image) marker
(9) history information Note that he history information may be stored in an application segment in the file.

Due to such a compatible file structure, it is possible to handle the compressed data of the processed image even by conventional general-purpose image processing software in the conventional manner.

Step S11: The completed history-added image file is recorded in the recording medium 25 by the recording unit 24.

Embodiment of Image Processing Program

Next, an image processing program for processing the history-added image file on a computer will be described.

Figure 5:
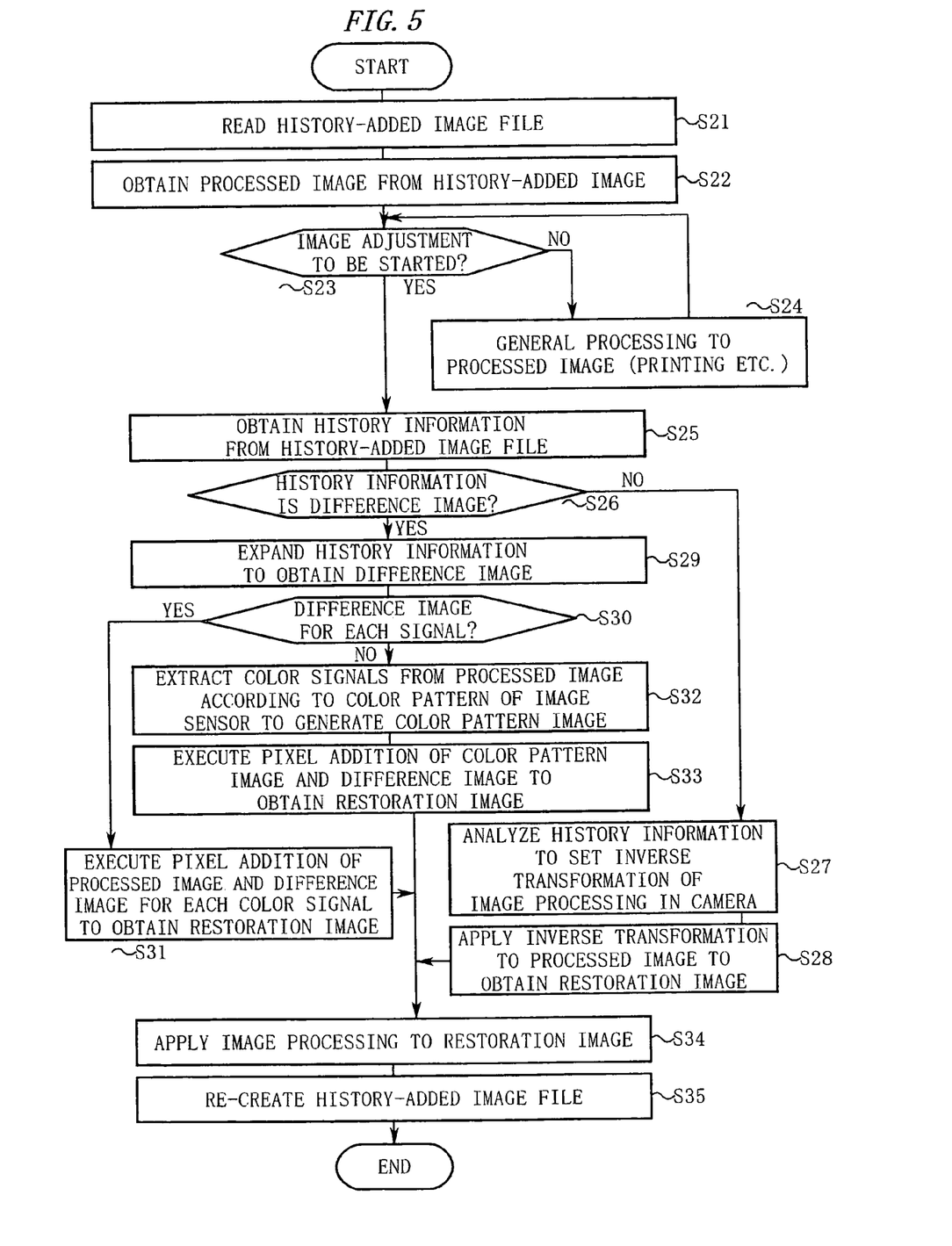
FIG. 5 is a flowchart describing computer operations by an image processing program.

FIG. 5 is a flowchart to describe computer operations controlled by the image processing program. Hereinafter, the operations will be described, following the step number shown in FIG. 5.

Step S21: The computer reads the history-added image file generated in the electronic camera 11 via the recording medium 25 or a communication medium to store it on a memory in the computer.

Step S22: The computer obtains the compressed data of the processed image from the history-added image file. The computer expands the image of the compressed data to obtain the processed image of the YCbCr color system. Next, the computer converts color coordinates of the processed image from the YCbCr color system to the RGB color system to obtain the processed image composed of RGB color signals.

Step S23: Upon receiving an instruction to adjust image quality of the processed image from a user, the computer shifts its operation to Step S25. On the other hand, when such an instruction is not inputted, the computer shifts its operation to Step S24.

Step S24: The computer positively uses the processed image in processing where the processed image is adequate (such as direct printing). After these processing, the computer shifts its operation to Step S23.

Step S25: On the other hand, in processing such as image quality adjustment where the use of the processed image will cause degradation in image quality, the computer generates the restored image. For this restoration processing, the computer obtains the history information from the history-added image file.

Step S26: The history information can be at least two kinds of information, namely, the difference image for canceling the irreversible image processing and parameter information for inversely transforming the reversible image processing. The computer judges which one of the difference image/the parameter information is contained in the history-added image file as the history information.

When as a result of the judgment, the history information is the parameter information, the computer shifts its operation to Step S27.

On the other hand, when the history information is the difference image, the computer shifts its operation to Step S29.

Step S27: The computer finds the inverse transformation parameter from the history information to set details of the inverse transformation according to the parameter. If the history information is simply the processing parameter for the image processing, the computer refers to the table as in Step S4 to obtain the inverse transformation parameter based on the processing parameter.

Step S28: The computer applies the set inverse transformation to the processed image to obtain the restored image. After this operation, the computer shifts its operation to Step S34.

Step S29: At this step, the computer expands the history information, namely, the compressed data of the difference image, to obtain the difference image.

Step S30: The computer judges whether or not the difference image is the difference image for each color signal as shown in FIG. 3.

Here, if the difference image is the difference image for each color signal, the computer shifts its operation to Step S31.

On the other hand, if the difference image is the difference image in the Bayer pattern as shown in FIG. 4, the computer shifts its operation to Step S32.

Step S31: The computer executes, for each color signal, addition of pixels of the difference image and the processed image to obtain the restored image. After this operation, the computer shifts its operation to Step S34.

Step S32: The computer selects color signals from the processed image according to the color pattern of the image sensor 13. By this processing, the processed image is transformed to the color pattern image having the same color pattern as that of the difference image. The transformation processing here is preferably completely equivalent to that at Step S7.

Step S33: The computer executes pixel addition of the difference image and the color pattern image to obtain the restored image in the Bayer pattern.

Step 34: The computer applies the image processing instructed by the user to the obtained restored image to generate a new processed image.

Step S35: The computer adds new history information to the new processed image obtained at Step S34 to create a history-added image file again. This re-creation processing is the same as the processing at and after Step S3 in FIG. 2, and therefore, the description thereof will not be given here.

Supplemental Matters to Embodiments

The above embodiments have described the RAW image in the Bayer pattern. However, the color pattern of the RAW image is not limited to the Bayer pattern.

Further, the above embodiments have described the case where the history adding device is mounted in the electronic camera 11. However, the present invention is not limited to this structure. For example, the history adding device may be mounted in a film scanner and so on.

Effects Etc. of Embodiments

For facilitating the application to other embodiments, principles of the effects of the above-described embodiments will be described in the following.

[1] The history adding device of the embodiment generates the history-added image file. This history-added image file includes the processed image that has undergone the image processing. This processed image, since having undergone the image processing, can be opened by general-purpose image display software for immediate printing. Further, it is possible to directly print the processed image by connecting the electronic camera 11 to a printer. As a result, high usability is attained.

The history-added image file further includes the history information. The use of the history information makes it possible to alleviate the influence of the image processing on the processed image. The restored image thus obtained, even if undergoing additional image quality adjustment, suffers little degradation in image quality ascribable to the repeated image processing. Therefore, it has the advantages similar to those of the conventional RAW image, for example, in that image quality is determined later, that the image is used for multiple purposes, and that the latest technology is applicable to the image.

As described above, in the embodiments, it is possible to generate the history-added image file having the merits of both the usability of the processed image and the applicability of the high-quality image processing using the restored image.

[2] Preferably, according to the embodiments, the reversibility of the image processing is judged according to the setting of the image processing, and the history information is changed when appropriate depending on the judgment result.

Specifically, if the image processing is judged as irreversible, the difference image between the input image and the processed image is added as the history information to the processed image. In this difference image, image information lost through the irreversible image processing is stored as a difference. Therefore, processing the difference image and the processed image later makes cancellation of even the irreversible image processing possible.

On the other hand, if the image processing is judged as reversible, the information indicating the settings of the image processing or the information indicating the inverse transformation of the image processing is defined as the history information. Executing the inverse transformation based on this history information enables the restoration processing. In particular, since this history information only has to be information for determining the inverse transformation, its data volume is far smaller than a data volume of the aforesaid difference image. Therefore, when the imaging processing is reversible, a data volume of the history-added image file can be adaptively reduced.

[3] Further, according to the embodiments, the input image is preferably the color image having the plural kinds of color signals on each pixel. In this case, as the history information, the difference image between the input image and the processed image is generated for each color signal.

Using the difference image for each color signal later enables the restoration processing for each color signal, so that the restored image having all the color signals can be created.

[4] Further, according to the embodiments, the input image is preferably the color image having the plural kinds of color signals arranged on each pixel according to the predetermined color pattern. In this case, by the image processing including the color interpolation, the processed image becomes a processed image having the plural kinds of color components on each pixel. Therefore, the color signals corresponding to the color pattern of the input image are extracted from this processed image, whereby the color pattern image having the same color pattern as that of the input image is generated. Then, the difference image between this input image and the color pattern image is generated as the history information.

Including this history information in the history-added image file enables the ex-post restoration processing as follows.

First, the processed image is obtained from the history-added image file, the color signals corresponding to the color pattern of the input image are extracted, and the color pattern image having the same color pattern as that of the input image is generated.

Next, the difference image is obtained from the history-added image file, and the color pattern image and the difference image are added, so that the restored image substantially equivalent to the input image is obtained.

Such processing can realize the processing of restoring the RAW image, for example, in the Bayer pattern from the processed image.

[5] Mounting the history adding device in the electronic camera allows the electronic camera to generate the aforesaid history-added image file therein.

Note that the processed image and the restored image is the same picture macroscopically and are thus similar images. The history information is used for transformation to/from these similar images, and therefore, it generally needs to have only a small data volume.

Therefore, the data volume required for the history-added image file is smaller than that required for the conventional simultaneous recording of RAW+JPEG. In the electronic camera, it is possible to realize reduction in recording time and increase in the number of recordable frames of the recording medium.

[6] Further, it is preferable to create the difference image between images before and after the image processing including edge enhancement. Using this difference image later enables ex-post removal of the influence that the edge enhancement gives to the image quality.

As a result, a high-frequency noise due to later high-frequency enhancement (such as unsharp masking) can be reduced. Further, degradation in image quality such as the thick overshoot or jaggy can be reduced.

[7] Further, it is preferable to create the difference image between images before and after the image processing including saturation enhancement. Using this difference image later enables ex-post removal of the influence that the saturation enhancement gives to image quality.

As a result, it is possible to reduce degradation in image quality such as the loss of natural hue due to color saturation in a specific color gamut, when the saturation enhancement is re-applied later.

[8] According to the image processing program of the embodiment, the restored image less affected by the image processing of the camera is generated using the history information. Even with additional image processing to this restored image, it is possible to avoid degradation in the image quality ascribable to the repeated image processing, creating a good image.

[9] According to the above-described embodiments, the history-added image file is re-created after the additional image quality adjustment. Therefore, repetitive image quality adjustment on the computer does not leads to repetitive overlapping image processing. That is, repetitive trial-and error image processing will not cause degradation in the image quality.

The invention is not limited to the above embodiments and various modifications may be made without departing from the spirit and scope of the invention. Any improvement may be made in part or all of the components.

What is claimed is:

1. A history adding device comprising:
   an image processing unit applying image processing to an input image to generate a processed image; and
   a history adding unit which generates history information necessary for restoration processing in which the processed image is restored to the input image, and adds the history information to the processed image to generate an image file being able to be subjected to the restoration processing (hereinafter, history-added image file).

2. The history adding device according to claim 1, wherein said history adding unit:
   judges whether the image processing is substantially reversible/irreversible, based on a setting of the image processing;
   adds a difference image between the input image and the processed image to the processed image as the history information, when judging that the image processing is irreversible; and
   adds, to the processed image as the history information, one of information indicating a setting of the image processing and information indicating inverse transformation of the image processing, when judging that the image processing is reversible.

3. The history adding device according to claim 1, wherein:
   the input image is a color image having a plurality of kinds of color signals on each pixel; and
   said history adding unit generates a difference image between the input image and the processed image for each of the color signals, and adds to the processed image the history information including the difference image for each of the color signals.

4. The history adding device according to claim 1, wherein:
   the input image is a color image having a plurality of kinds of color signals arranged on each pixel according to a predetermined color pattern;
   said image processing unit applies at least color interpolation to the input image to generate a processed image having a plurality of kinds of color components arranged on each pixel; and
   said history adding unit extracts color signals of the color pattern from the processed image to generate a color pattern image, and adds a difference image between the input image and the color pattern image to the processed image as the history information.

5. An electronic camera comprising:
   the history adding device according to claim 1; and
   an image-capturing unit capturing an image of a subject to generate an input image, wherein said history adding device processes the input image to generate a history-added image file.

6. The electronic camera according to claim 5, wherein said history adding device finds a difference image between an image before edge enhancement and an image after edge enhancement, and adds the difference image to the image after edge enhancement as the history information, to thereby generate the history-added image file from which an effect of the edge enhancement of the electronic camera can be eliminated later.

7. The electronic camera according to claim 5, wherein said history adding device finds a difference image between an image before saturation enhancement and an image after saturation enhancement, and adds, as the history information, the difference image to the image after saturation enhancement, to thereby generate the history-added image file from which an effect of the saturation enhancement of the electronic camera can be eliminated later.

8. An image processing program stored on a computer-readable medium for causing a computer to apply image processing to a history-added image file generated in the electronic camera according to claim 5, the program comprising program codes for causing the computer to function as:

an input processing unit obtaining a processed image and history information from the history-added image file;

a restoration processing unit applying a restoration processing indicated by the history information to the processed image to obtain a restored image which is an image approximate to an input image before the image processing; and an image re-processing unit applying a new image processing to the restored image obtained by said restoration processing unit.

* * * * *